United States Patent
White

[15] 3,636,756
[45] Jan. 25, 1972

[54] ULTRASONIC SEARCH UNIT WITH ROLLING CONTACT

[72] Inventor: Allwyn M. White, Danbury, Conn.
[73] Assignee: Automation Industries, Inc., Century City, Calif.
[22] Filed: Sept. 11, 1969
[21] Appl. No.: 857,104

[52] U.S. Cl. .............................................. 73/71.5, 73/67.85
[51] Int. Cl. ......................................................... G01n 29/00
[58] Field of Search .......................... 73/67.5–67.9, 71.5; 310/8.3

[56] References Cited

UNITED STATES PATENTS

| | | | |
|---|---|---|---|
| 2,545,101 | 3/1951 | Mevnier | 73/71.5 X |
| 3,168,659 | 2/1965 | Bayre et al. | 73/67.5 X |
| 3,205,702 | 9/1965 | Joy | 73/71.5 |
| 3,257,843 | 6/1966 | Cowan | 73/71.5 |
| 3,309,655 | 3/1967 | Von Ardenne | 73/67.7 X |
| 3,274,833 | 9/1966 | Ollivier et al. | 73/407 |
| 3,290,945 | 12/1966 | Li et al. | 73/407 |

FOREIGN PATENTS OR APPLICATIONS

| | | | |
|---|---|---|---|
| 543,861 | 1/1956 | Belgium | 73/71.5 |

*Primary Examiner*—Richard C. Queisser
*Assistant Examiner*—Arthur E. Korkosz
*Attorney*—Dan R. Sadler

[57] ABSTRACT

An ultrasonic wheel search unit for testing elongated bodies wherein a fluid impervious, flexible, ultrasonically transparent diaphragm defines a fluid-filled wheel chamber and a separate fluid-filled transducer chamber, enabling rapid transducer change. Means are provided to vary the relative pressure between dissimilar fluids in the two chambers to vary the beam pattern of the search unit.

12 Claims, 4 Drawing Figures

3,636,756

Allwyn M. White,
INVENTOR.

Allwyn M. White,
INVENTOR.
BY.
Jan R. Sadler
ATTORNEY.

3,636,756

ULTRASONIC SEARCH UNIT WITH ROLLING CONTACT

BACKGROUND OF THE INVENTION

1. Field of Invention

The present invention relates to an ultrasonic search unit and more particularly to a wheel-type search unit providing a rolling coupling to test elongated material having means enabling rapid transducer replacement and enabling variation of the transducer beam pattern.

2. Description of Prior Art

At the present time it is frequently desirable to transmit ultrasonic energy into a material for inspecting, testing and/or measuring the material. One means of accomplishing this is to employ a transducer having a mechanically vibratable member which may be interconnected with a source of electrical signals such as an oscillator that operates in the ultrasonic region. The transducer will thereby radiate ultrasonic energy. If the transducer is acoustically coupled to a test specimen the radiated ultrasonic energy will be directed into the specimen. By observing the manner in which this ultrasonic energy travels through the specimen and/or is internally reflected, various characteristics such as the presence of internal flaws, dimensions, etc., may be determined.

Normally, the mechanically vibratable member in the transducer is a piezoelectric member such as a quartz crystal or a piezoelectric ceramic material, having a radiating surface which mechanically vibrates when a suitable electrical signal is applied thereto. The mechanical vibrations of the radiating surface cause corresponding vibrations to be coupled into the surrounding medium so as to travel therethrough as a beam of ultrasonic energy.

During testing the ultrasonic transducer must, of course, be coupled to the test material or workpiece. When the workpiece is itself moving, the ultrasonic transducer must be coupled to the material in a fashion which is compatible with the movement. For applications such as the measurement or testing of tubes and bars in production, transducer units have been developed which use rotating members to couple longitudinal waves into and out of the workpieces. One such prior art wheel-type search unit has a rolling coupler which may be generally described as a hollow wheel having an ultrasonically transparent tire inflated with a liquid. A piezoelectric crystal, or other generator of longitudinal ultrasonic waves, is immersed within the liquid in the wheel and, upon excitation of the generator, ultrasonic waves are transmitted radially outwardly through the fluid couplant to the surface of the tire, and after passing through the tire, are coupled to the workpiece.

The pattern of the beam and the manner in which the energy is distributed within the beam is determined by a wide variety of factors such as the size and shape of the surface of the crystal, the frequency of the energy and the distance from the crystal. Heretofore, the energy from a transducer in a wheel-type search unit has been radiated in a predetermined fixed pattern that could not be readily varied. Although the radiation pattern for any given transducer may be particularly well suited for certain types of observations, it may not be well suited for other types of observations. For example, if the transducer radiates a broad beam it is extremely difficult, if not impossible, to detect small internal flaws, particularly those flaws located within the near field region. Conversely, if the transducer radiates a very narrow beam it is extremely difficult, if not impossible, to rapidly search large areas. As a consequence, it has been necessary to select a transducer that radiates a beam especially adapted to the particular operation being performed. If the operation to be performed is changed, it has been necessary to replace the transducer employed in the search unit with another more suitable type.

Replacing the transducer in wheel-type search units has heretofore been a difficult, time consuming task. The search unit must be demounted and the wheel laid on its side. The pressure maintained in the search unit to enable coupling ultrasonic energy through the tire to the workpiece is released as the transducer is removed and another is inserted. This results in a loss of coupling fluid, introducing air bubbles into the interior of the tire. Since such bubbles cause spurious responses and greatly attenuate transmitted and received ultrasonic energy traversing the wheel, great pains must be taken to remove all bubbles from the search unit before resealing.

SUMMARY OF THE INVENTION

In the present invention the ultrasonic transducer is mounted in a chamber separated from the fluid-containing chamber including the rotating wheel by a flexible diaphragm which is transparent to ultrasonic energy. When replacing the transducer, the fluid under pressure contained in the chamber including the rotating wheel need not be disturbed. The transducer may then be readily removed and replaced without introducing bubbles of air. A coupling fluid is provided in the chamber including the transducer and separated by the diaphragm from the rotating wheel. The coupling fluid in the transducer chamber may have different ultrasonic properties from that contained within the rotating wheel chamber. Means are provided for varying the pressure of the fluid in the transducer chamber, enabling variable deflection of the diaphragm separating the transducer chamber from the wheel. Deflection of the diaphragm, separating fluids having differing ultrasonic properties, such as velocity of propagation, enables variation of the beam shape produced by the transducer. Such variation in beam shape enables greater versatility of use of a given transducer, reducing the need for changing transducers.

DESCRIPTION OF THE PREFERRED EMBODIMENT

Figure 3:
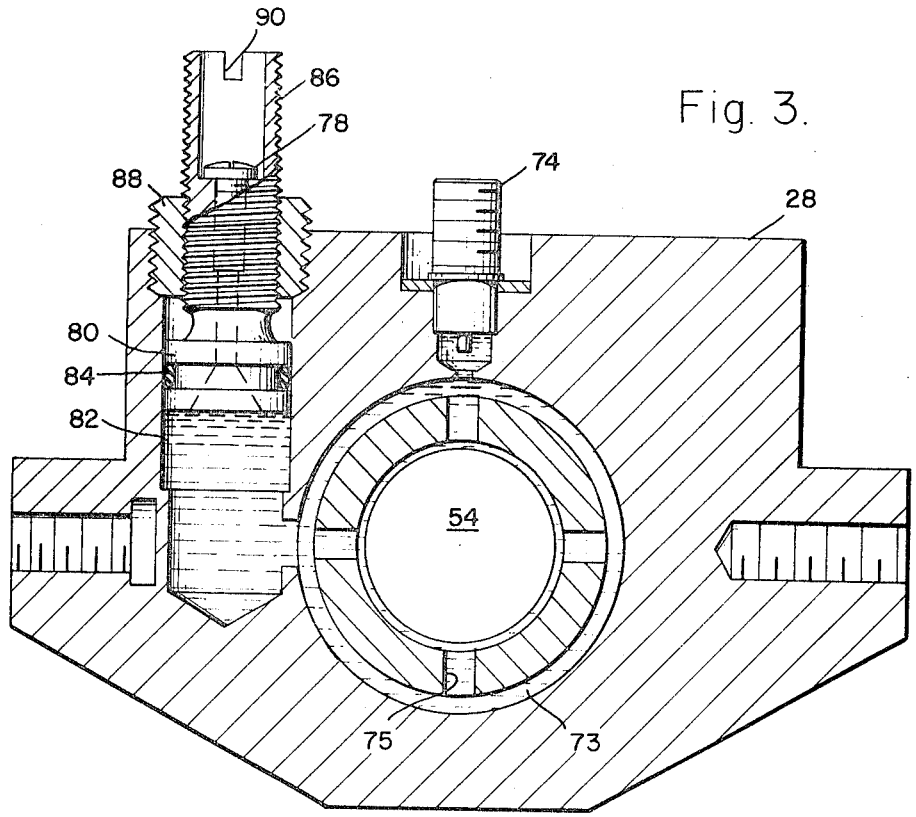
FIG. 3 is a section taken along line 3—3 of FIG. 2.
Figure 1:
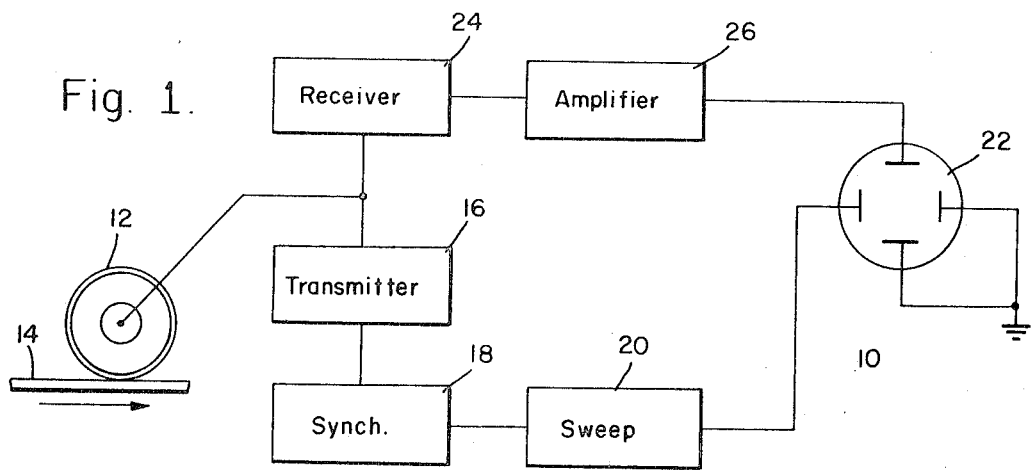
FIG. 1 is a simplified block diagram illustrating an ultrasonic test system employing the wheel search unit of the present invention.

A simplified schematic diagram of an ultrasonic testing system 10 is illustrated in FIG. 1. An ultrasonic wheel search unit 12 is provided having a wheel adapted to rotate to accommodate rapid relative movement of a workpiece 14 with respect to the search unit 12. The search unit 12 includes an ultrasonic transducer connected to a pulse transmitter 16. The pulse repetition rate of transmitter 16 is controlled by synchronizing pulse generator 18. Also controlled by synchronizing pulse generator 18 is sweep generator 20, connected to the horizontal deflection plates of cathode-ray oscilloscope 22.

Ultrasonic pulses generated by the transducer in response to electrical pulses from transmitter 16 are launched into workpiece 14. The ultrasonic pulses are reflected by flaws which may be present in the workpiece 14. The reflected ultrasonic pulses are received by the search unit and converted back into ultrasonic frequency electrical signals by the transducer. The ultrasonic frequency signals are applied to a receiver 24, wherein they are converted into video signals. Video signals from receiver 24 are amplified by a suitable video amplifier 26 and applied to the vertical deflection plates of cathode-ray oscilloscope 22. Sweep generator 20 provides the horizontal sweep triggered by synchronizing pulse generator 18 simultaneously with the transmitted pulse. The video signals deflect the horizontal sweep vertically at a time dependent upon the depth of the flaw in workpiece 14 reflecting the ultrasonic pulses. The horizontal sweep may be calibrated to read depth directly.

The ultrasonic wheel search unit 12 of the present invention includes a fixed hub assembly 28 and a rotating wheel assembly 30 rotating about hub assembly 28. Wheel assembly 30 is mounted on rear ball bearing 32 and front ball bearing 34 which are secured to hub assembly 28, enabling rotation of wheel assembly 30 about hub assembly 28. Tire clamp 36, removably secured to rear wheel housing 38, seals the ultrasonically transparent tire 42 to wheel housing 38. The second rim 44 of tire 42 is secured to front wheel housing 46 by a removably mounted clamp and valve assembly 48. A circular sealing member 50 is mounted on rear wheel housing 38. Sealing member 50 is provided with a lip bearing against the circumference of hub assembly 28 to prevent leakage of coupling fluid from the interior of wheel assembly 30 through the rear ball bearing 32.

In contrast to the provision of seal 50 to prevent leakage through the rear ball bearing 32, no attempt is made to keep the coupling fluid out of front ball bearing 34. Front ball bearing 34 is of a type adapted to operate immersed in the coupling fluid such as distilled water, contained within wheel assembly 30.

Figure 2:
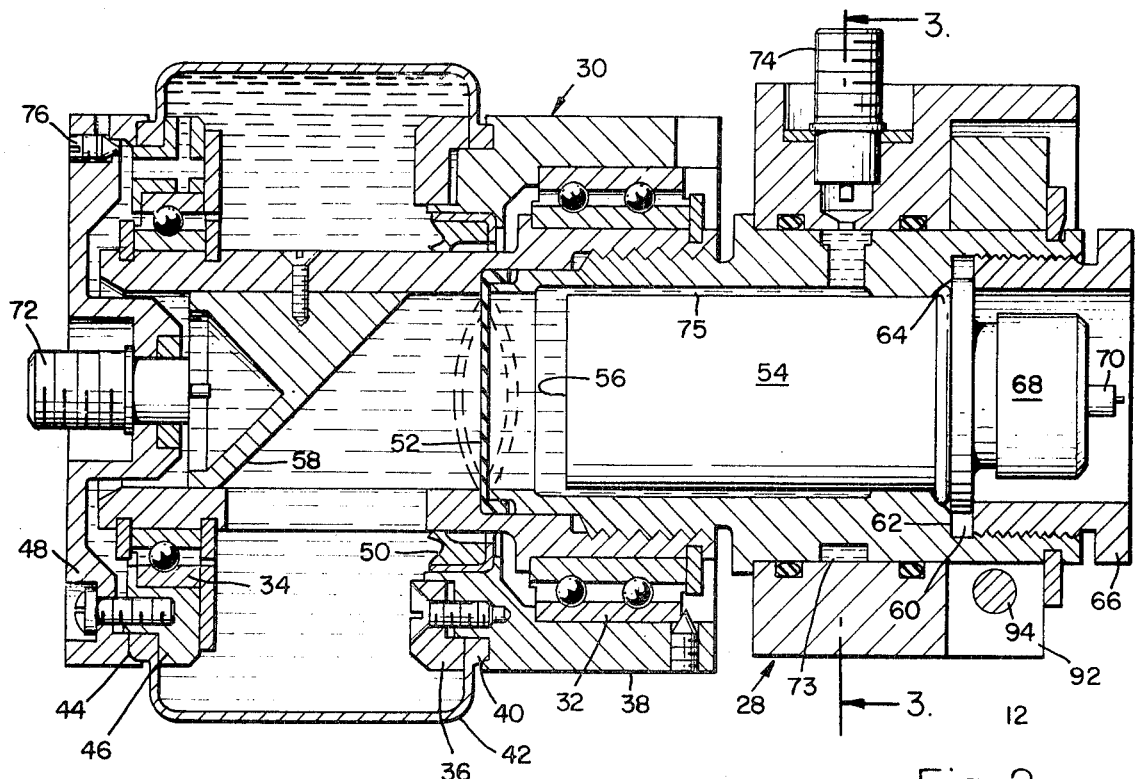
FIG. 2 is a cross-sectional view of the wheel search unit.
Figure 4:
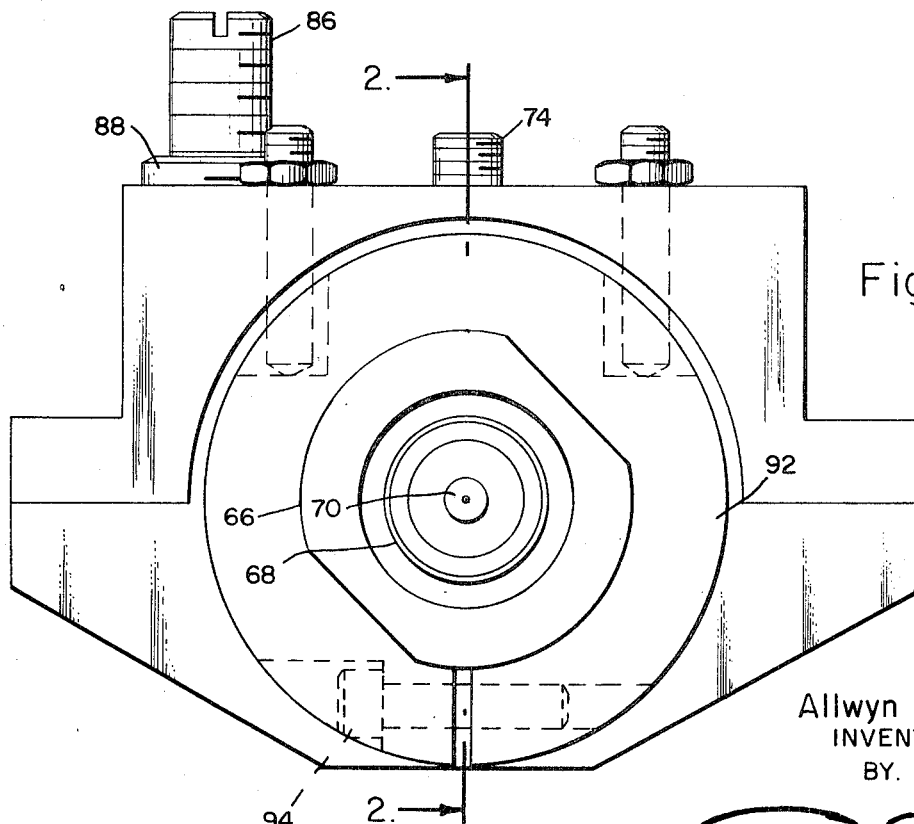
FIG. 4 is an end view of the search unit of FIG. 2.

Hub assembly 28 is conveniently fabricated in three portions which are threaded together as illustrated in FIG. 2. A flexible diaphragm 52, transparent to ultrasonic energy, is mounted between the two threaded portions of hub assembly 28. Diaphragm 52 serves to divide search unit 12 into two separate fluidtight chambers, each adapted to be filled with coupling fluid separately and individually. The two fluids may differ in composition, and have different pressures.

A cylindrical piezoelectric ultrasonic transducer 54 is removably mounted in the hollow cylindrical interior of hub assembly 28. As is well known to those skilled in the art, the transducer 54 is provided with an active piezoelectric surface 56 at the end of the cylindrical body, adapted to direct a beam of ultrasonic energy through diaphragm 52. A planar reflector 58 having a reflecting surface at substantially a 45° angle to the plane of the active surface 56 of transducer 54, is provided to change the path of the beam of ultrasonic energy, reflecting the beam through an angle of 90°, directing the beam downwardly through the bottom of tire 42, adapted for contact with workpiece 14.

The transducer 54 is provided with a flange 60 abutting against shoulder 62 on hub assembly 28. An O-ring seal 64 on transducer 54 adjacent flange 60 cooperates with shoulder 62 to seal the coupling fluid-filled transducer chamber, thereby preventing leakage of coupling fluid about flange 60. A hollow threaded nut 66 engages with the threads provided on the interior of hub assembly 28, bearing against flange 60 to compress O-ring seal 64 against shoulder 62. The hollow interior of nut 66 enables access to electrical connector 68, providing for connection of transducer 54 into circuit with transmitter 16 and receiver 24 through an electrical conductor, such as a coaxial cable 70.

As disclosed hereinabove, diaphragm 52 divides wheel search unit 12 into two separate fluidtight compartments. Each compartment is provided with filling means for filling the compartment with a suitable ultrasonic coupling fluid. The wheel compartment is provided with a wheel coupling fluid-filling valve 72 and the transducer compartment is provided with a transducer compartment coupling fluid-filling valve 74. A circular channel 73 and longitudinal groove 75 distribute the coupling fluid from filling valve 74 about the periphery of the transducer 54, and into the space between active surface 56 and diaphragm 52.

Since gasses are substantially opaque to ultrasonic energy, means must be provided to eliminate from the compartments any gas bubbles remaining after filling the compartments with coupling fluid through filling valve 72. A bleed valve 76 is provided in the wheel compartment to enable bleeding out gas bubbles remaining in the wheel compartment. Bleed valve 76 is open during the filling operation until all gas bubbles are expelled. Bleed valve 76 may then be closed. Coupling fluid may continue to be forced into the wheel compartment filling valve 72 until the desired pressure is reached. Filling valve 72 may then be closed, sealing the wheel compartment. The wheel compartment now need not be disturbed when it is desired to change the transducer. Refilling is necessary only in case of a leak due to an accident.

The transducer compartment may conveniently be filled through the hollow cylindrical interior of hub assembly 28. Transducer 54 is then inserted into the cylindrical interior of hub assembly 28, forcing excess fluid out about the flange 60. Nut 66 is screwed into the hub assembly, compressing O-ring seal 64. Additional fluid may be added if necessary through transducer compartment filling valve 74. Any gas bubbles present in the transducer compartment may be bled off through bleed valve 78. Reasonable care while replacing a transducer prevents inclusion of any bubbles, however. Upon reaching the desired nominal pressure within the transducer compartment, filling valve 74 may be closed.

Means are provided whereby the relative pressures in the wheel compartment and transducer compartment may be varied to vary the position of diaphragm 52. The employment of coupling fluids having differing ultrasonic propagation characteristics enables the beam pattern to be varied by varying the configuration of diaphragm 52 defining the interface between the two different coupling fluids. Exemplarily, the wheel compartment may be filled with distilled water and the transducer compartment may be filled with glycerin. By varying the relative pressures in the two compartments, diaphragm 52 may be caused to assume a convex shape bulging toward reflector 58, or may be caused to assume a concave configuration facing reflector 58.

A cylinder 82 communicating with the transducer coupling fluid compartment is provided with an adjustable piston 80. Fluidtightness is maintained between piston 80 and the walls of cylinder 82 by means of an O-ring seal 84 mounted in a groove about the circumference of piston 80. Piston 80 is provided with an externally threaded portion 86 cooperating with an internally threaded insert 88 secured to hub assembly 28. A groove 90 is provided for screwdriver adjustment of the position of piston 80. As piston 80 is advanced into cylinder 82, the pressure in the transducer chamber is increased, forcing diaphragm 52 to bulge outwardly toward reflector 58. Conversely, withdrawing piston 80 upwardly in cylinder 82 lowers the pressure in the transducer chamber and diaphragm 52 is bowed inwardly toward active face 56 of transducer 54 by the relatively greater pressure in the wheel compartment.

As disclosed hereinabove coupling fluids having differing propagation characteristics are present in the two compartments. The shape of diaphragm 52 defines the shape of the interface between the fluids in the two compartments. When diaphragm 52 is caused to bulge toward transducer 54 by lowering the pressure, a concave lens is formed. The beam of ultrasonic energy propagated between active face 56 of transducer 54 is caused to diverge by the concave lens resulting in a relatively wide beam pattern. Conversely, when the diaphragm 52 is caused to bulge convexly toward reflector 58 a convex lens is formed. The beam of ultrasonic energy from transducer 54 becomes convergent, resulting in a coverage of a smaller area of the workpiece. Obviously when the pressures are adjusted to be equal, diaphragm 52 remains planar and there is no effect upon the shape of the beam of ultrasonic energy transmitted by the transducer.

The wheel search unit assembly of the present invention is normally fixedly mounted adjacent the path of the workpiece.

It is usually desirable to have the beam of ultrasonic energy enter the workpiece perpendicularly to the surface thereof. Means are provided, therefore, to enable rotation of the hub assembly with respect to the mounting bracket portion of hub assembly 28. A split ring clamp 92 is adapted to be tightened and secured by a machine screw 94. Hub adjusting screws may be loosened to enable relative rotation of hub assembly 28 with respect to the mounting fixture. At the optimum position the locknuts on adjusting screws are secured thus locking the position of hub assembly 28.

The wheel search unit disclosed hereinabove enables quick and simple replacement of transducer units without requiring disassembly and time-consuming refilling of the search unit. Further, means are provided for varying the pattern of the ultrasonic beam provided by the transducer installed in the search unit. By a simple screwdriver adjustment, the beam of ultrasonic energy from a given transducer may be caused to become divergent or convergent as required.

I claim:

1. In combination with an instrument for ultrasonically inspecting a workpiece:
   a fixed hub including a hollow interior;
   a spindle separably mounted to said fixed hub and including a hollow interior aligned with the hollow interior of said fixed hub, said spindle including an opening disposed perpendicular to the axis of said spindle leading from the hollow interior thereof;
   a first chamber being defined in the hollow interior of said hub;
   a second chamber being defined in the hollow interior of said spindle;
   an ultrasonic transparent separating wall mounted in the interior of said spindle separating said first chamber from said second chamber;
   an ultrasonic transducer disposed in said second chamber, said transducer having a beam emitting surface disposed parallel to the surface of said separating wall;
   a wheel assembly rotatably mounted on said spindle;
   an ultrasonic transparent tire mounted on said wheel assembly including an interior area said tire being adapted to be in rolling contact with the workpiece;
   fluid coupling means disposed in said first chamber and second chamber;
   reflector means disposed in said first chamber for directing ultrasonic beams from the beam emitting surface of said transducer towards the opening in said spindle and to the entrant surface of said workpiece; and
   means mounted in said hub and communicated with said second chamber for changing the relative pressures of fluid between said first chamber and second chamber;
   whereby said wheel assembly and said tire roll across the surface of said workpiece during a test and serve to transmit ultrasonic energy to and from said workpiece and whereby the path of ultrasonic energy is from the beam emitting surface of said transducer through the ultrasonically transparent separating wall, reflected from said reflector means and into said workpiece.

2. In combination:
   a container including a first chamber and a second chamber, each chamber being separably coupled to the other, said container including a rotatable contacting surface mounted to the second chamber, and a transducer unit disposed in the first chamber in said container, said transducer having a beam emitting surface disposed parallel with said diaphragm;
   a flexible diaphragm mounted in said container separating the first and second chamber of said container;
   fluid means disposed in said container filling said first chamber and said second chamber thereof; and
   means for changing the relative pressure of the fluid means between the first chamber and the second chamber of said container;
   whereby the rotatable contacting surface of said container rolls across a workpiece during a test and serves to transmit ultrasonic energy to and from said workpiece and whereby the path of ultrasonic energy is from the beam emitting surface of said transducer through said flexible diaphragm into said workpiece.

3. The combination defined in claim 2 and including beam deflecting means mounted in the second chamber of said container for deflecting the beam of said transducer towards said contacting surface.

4. An ultrasonic search unit including:
   a fixed hub;
   a spindle mounted to said hub;
   a first chamber and a second chamber defined in said fixed hub and said spindle, said first chamber and said second chamber being substantially aligned with each other;
   an ultrasonic transparent separating wall mounted to said first chamber to separate said first chamber and second chamber;
   a ultrasonic transducer disposed in said second chamber;
   access means in said second chamber for gaining access into said second chamber for allowing access to said transducer therein;
   a wheel assembly rotatably mounted on said spindle;
   an ultrasonic transparent tire on said wheel assembly including an interior area in fluid communication with said first chamber; and
   fluid coupling means disposed in said first chamber and said second chamber;
   whereby said wheel assembly and said tire roll across a surface of a workpiece during a test and serve to transmit ultrasonic energy to and from said workpiece and whereby the path of said transmitted ultrasonic energy is from said transducer through said separating wall and into said workpiece.

5. The search unit as defined in claim 4 and including reflector means in said second chamber for reflecting ultrasonic energy from said transducer at a substantially 45° angle.

6. The search unit as defined in claim 4 wherein said separating wall being a flexible diaphragm.

7. The search unit as defined in claim 6 and further including means for changing the relative pressure of the coupling fluid between said first chamber and said second chamber.

8. The search unit as defined in claim 6 and including reflector means in said second chamber for reflecting ultrasonic energy from said transducer at a substantially 45° angle.

9. In combination:
   a container including a first chamber and a second chamber, each chamber being separably coupled to the other;
   a separating wall mounted to the first chamber in said container separating said first chamber and said second chamber and sealing said first chamber;
   fluid means disposed in said container filling said first chamber and said second chamber;
   a wheel assembly rotatably mounted on said container and including a tire having an interior in fluid communication with the first chamber; and
   a transducer disposed in the second chamber of said container;
   whereby the tire and wheel assembly roll across a surface of a workpiece and serve to transmit ultrasonic energy from said transducer through said separating wall and said fluid means and into said workpiece.

10. In the combination of claim 9 wherein said separating wall being a flexible diaphragm.

11. In the combination as defined in claim 10 and including means for changing the relative pressures of said fluid means between said first chamber and said second chamber.

12. In combination an ultrasonic search unit with an instrument for ultrasonically inspecting a workpiece;
   a fixed hub including a hollow interior;
   a spindle separably mounted to said fixed hub and including a hollow interior aligned with the hollow interior of said fixed hub, said spindle including an opening disposed perpendicular to the axis of said spindle leading from the hollow interior thereof;
   a first chamber being defined in the hollow interior of said hub;
   a second chamber being defined in the hollow interior of said spindle;
   an ultrasonically transparent separating wall mounted in the interior of said spindle separating said first chamber from said second chamber;
   an ultrasonic transducer disposed in said second chamber, said transducer having a beam emitting surface disposed parallel to the surface of said separating wall;
   a wheel assembly rotatably mounted on said spindle;

an ultrasonically transparent tire mounted on said wheel assembly including an interior area, said tire being adapted to be in rolling contact with the workpiece;
a first fluid coupling means disposed in said first chamber;
a second fluid coupling means being disposed in said second chamber said first fluid coupling means and said second fluid coupling means having different acoustic impedances;
reflector means disposed in said first chamber for directing ultrasonic beams from the beam emitting surface of said transducer towards the opening in said spindle through said separating wall and to the entrant surface of said workpiece;
a cylinder in said hub portion communicating with said second chamber;
an adjustable piston disposed in said cylinder; and
means for adjusting the relative position of said piston in said cylinder.

* * * * *